United States Patent [19]

Farris et al.

[11] Patent Number: 5,953,399

[45] Date of Patent: Sep. 14, 1999

[54] PBX SELECTIVE CALLER IDENTIFICATION AUTHENTICATION

[75] Inventors: Robert D. Farris, Sterling, Va.; Michael J. Strauss, Potomac, Md.

[73] Assignee: Bell Atlantic Network Services, Inc., Arlington, Va.

[21] Appl. No.: 08/816,909

[22] Filed: Mar. 13, 1997

[51] Int. Cl.[6] ............................ H04M 1/56; H04M 15/06
[52] U.S. Cl. ........................... 379/201; 379/142; 379/229
[58] Field of Search ..................................... 379/127, 142, 379/201, 207, 173, 210, 211, 219, 220, 221, 229, 231, 232, 234, 245, 246

[56] References Cited

U.S. PATENT DOCUMENTS

| | | | |
|---|---|---|---|
| 4,551,581 | 11/1985 | Doughty | 379/201 |
| 4,582,956 | 4/1986 | Doughty | 379/142 |
| 5,161,181 | 11/1992 | Zwick | 379/142 |
| 5,163,087 | 11/1992 | Kaplan | 379/142 |
| 5,274,699 | 12/1993 | Ranz | 379/142 |
| 5,412,711 | 5/1995 | Hayashi | 379/142 |
| 5,497,414 | 3/1996 | Bartholomew | 379/142 |
| 5,521,969 | 5/1996 | Paulus et al. | 379/201 |
| 5,530,741 | 6/1996 | Rubin | 379/142 |
| 5,533,106 | 7/1996 | Blumhardt | 379/142 |
| 5,590,184 | 12/1996 | London | 379/213 |
| 5,812,639 | 9/1998 | Bartholomew et al. | 379/100.08 |

*Primary Examiner*—Harry S. Hong
*Assistant Examiner*—Benny Q. Tieu
*Attorney, Agent, or Firm*—McDermott, Will & Emery

[57] ABSTRACT

The present invention uses capabilities of the advanced intelligent network (AIN) to control an authentication process of caller ID information data generated at a calling PBX system. The central office switching facility associated with the calling PBX system identifies calls therefrom that contain caller ID numbers that are not the PBX assigned telephone number. For such calls, the switching facility invokes triggers through the AIN common channel signaling network to access data base information in an Integrated Service Control Point (ISCP) and/or system LIDB for authenticating and controllably transmitting caller ID information. Unauthenticated information may be blocked or transmitted with notice that the information has not been authenticated.

15 Claims, 5 Drawing Sheets

PBX SELECTIVE CALLER IDENTIFICATION AUTHENTICATION

RELATED APPLICATION

This application is related to application Ser. No. 08/725,349, filed Oct. 1, 1996 and entitled CALLER SELECTIVE IDENTIFICATION FOR TELEPHONE CALLS, and assigned to the assignee of the present application.

TECHNICAL FIELD

The present invention relates to telephone systems that convey selective caller line identification information to called parties and, more particularly, to the control of caller PBX system identification.

BACKGROUND ART

Caller ID is a telephone on-hook capability that provides a called party with information about the caller before the incoming call is answered. Conventionally, such information includes the date and time of the call and the caller's telephone number. A data message, preceded by a channel seizure signal, is sent in conjunction with the ringing signal from the central office to the called party during the silent interval after the first 20-Hz, 2-second ringing phase.

Caller ID service is designed for use with the voice portion of existing loop connections. The digitally formatted message is transmitted through a stream of data bits of standardized digital format. The message is sent once, without retransmission capability. The channel seizure signal, sent at the beginning of each message to alert the called party equipment of the coming information through physical connection of an appropriate interface, is typically composed of thirty continuous bytes of octal 125 (i.e., 01010101), or 250 milliseconds of a 600-Hz square wave. Transmission of data follows thereafter and is completed prior to the next 20-Hz ringing signal. For a detailed description of the method and apparatus for sending the data message, reference is made to U.S. Pat. No. 4,551,581 issued to Doughty on Nov. 5, 1985.

The receiving display apparatus at a caller ID subscriber location may be as disclosed in U.S. Pat. No. 4,582,956, issued Apr. 15, 1986. The apparatus, which may be a part of a telephone instrument or a stand-alone device, includes a line interface unit, a converter, a control circuit and a display unit. A frequency shift keyed (FSK) signal representing the special service information is filtered from the ringing signals by the line interface unit. The converter detects the FSK signal and demodulates the special service information from the FSK signal. Following detection of the FSK signal, the control circuit receives and stores the special service information. The stored information is periodically sent to the display unit to begin exhibiting thereof during the silent interval before the next ringing signal.

The caller ID service in the public switched telephone network (PSTN) offers several advantages to the called party subscriber. Identification of the calling party, as provided by the caller ID service, allows the called party to screen an incoming call personally before its completion and thereby to decide whether or not it is desirable to answer the call. Nuisance calls, such as advertising and solicitation calls, can be avoided if the identity of a caller can determined before a call is answered. Knowledge of caller identity also serves as a resource for dealing with and curtailing harassment calls.

Reference is made to U.S. Pat. No. 5,497,414, issued to Bartholomew on Mar. 5, 1996, for a discussion of the advantages to the called party subscriber as well as the countervailing disadvantageous effects on the caller's privacy. If the caller number identity is made known to a called party caller ID subscriber each time a call is made, the privacy afforded to a caller having an unlisted number is significantly compromised. Similarly, any caller may find it desirable to place a call without revealing origination identity to the called party. In such case, the caller must take the risk that the called party line does not subscribe to the caller ID service.

As a recourse, the caller in some existing systems is given the option to block transmission of caller line origination identity to the called party. If the called party is a caller ID service subscriber, the display unit will either indicate a caller privacy condition or remain blank. Reference is made to U.S. Pat. No. 5,161,181, issued to Zwick on Nov. 3, 1992, for discussion of this concept. With caller ID blocked, a call is directed to the called party for completion in the standard manner and the functionality of caller ID is lost, along with its advantages to the called party subscriber. The caller can thus retain anonymity with an increased likelihood that the called party will elect not to answer the call.

Accommodating the requirements of called party subscribers to screen the origination of incoming calls before answering, while permitting calling subscribers to individually control what origination information will be transmitted for placed calls, is an ongoing concern of service providers. Enhancements to the basic caller ID service have further complicated these considerations.

With one such enhancement the network provides the caller's name as well as the caller's number for display at the caller ID box of the called party. The phrase "enhanced service" as used herein refers to the capability of supplying both text and telephone caller number identification information. A caller who blocks caller ID to avoid a return call from the called party may find benefit in transmitting the name information alone for identification purposes. Conventionally, the ability to transmit name information without originating telephone number information is not available. Moreover, the provision of additional caller ID information increases the risk that misleading information will be transmitted. For example, a call may be placed from a subscriber location at which several people reside. If the caller is not the listed subscriber, the called party may not recognize the identified caller name and choose not to answer the call. Identification of the name of the actual caller instead of the name of the subscriber is a function that prior art telephone systems lack. Such a function would be a benefit both to the called party, who may know the called party and thus answer the call, and the calling party who is more likely to have the call completed.

Complications also arise with callers that subscribe to distinctive ringing type services that provide a plurality of telephone numbers for the same subscriber line. The distinctive ringing service subscriber may reserve one number for important calls, which would be answered under most circumstances, while using another number for less important calls that the subscriber may choose to ignore. Alternatively, each number may be associated with a different resident, the intended called party being indicated by the distinctive ring. In other circumstances a subscriber may require two telephone numbers for a single line to distinguish between business calls and personal calls. The business name would be listed for the business number, while the subscriber's name would be listed for the personal use number.

Conventionally, one of the listings for the multiple number line is recognized as a primary listing, the remainder as secondary listing(s). A called party subscriber to the basic caller ID service would receive from a multiple line calling subscriber a display of the caller's primary telephone number. A called party subscriber to the enhanced caller ID service would additionally have displayed the primary name associated with the primary number. The calling party may not wish to transmit the primary number and its associated listed name for a particular call. Depending upon the purpose of the call, a secondary number listing may be appropriate. A similar situation exists with a business subscriber who has a plurality of stations, each with a direct dial number. A caller from one of the stations may wish to select among several numbers to be displayed to the called party.

The above-identified application, Ser. No. 08/725,349, describes a system and method for distinguishing between numbers, as well as names, in the transmission of caller identification information for an individual call. The advanced intelligent network (AIN) is used to allow a calling party to specify what caller ID information to send to the called party for display. The telephone system Line Identification Data Base (LIDB) contains listings for subscribers that may each include a plurality of assigned telephone numbers and names. On an individual call basis, a calling subscriber can control what information is to be extracted from LIDB for identification to the called party. Various identification options may be pre-established, the caller invoking a selected option by dialing a corresponding access code with the dialed telephone number.

The system described above affords great flexibility to calling parties while safeguarding the interests of called parties to receive accurate information. These advantages are attributable to a large extent to the fact that the calling party identifying information, while conforming to a caller's preselected desired design, is generated by the network. As the information is prestored in a data base, called parties can be safeguarded against receipt of inappropriate information. The accuracy of the caller's identifying information can be verified upon storage by the system prior to transmission in telephone calls. Such verification need be done only when new identifying information is entered into the data base, as only the verified information can be transmitted thereafter. A called party thus has a reasonable expectancy that the received calling party information is reliable.

This safeguard of the above described system, however, is not available for calls placed from a PBX system, which can generate calling party information data at the discretion of the private administrator, or an acting individual, on a call by call basis to be transmitted via a PBX trunk to its associated PSTN switching facility. A calling party from the PBX system can simply dial out the called party number without need for an access code as the desired calling party information can be programmed at the PBX. With such on premises control, there is no need for the PBX customer to subscriber to the LIDB access selective caller ID service. The calling party can thus output erroneous text information as well as indicate an inaccurate and unverified calling party number. The receiver of such call, upon returning the call, may unintentionally reach a third party instead of the actual calling party, to the annoyance of both the returning caller and the third party. This nuisance can also exist for called parties who do not subscribe to caller ID services but invoke a "return call" service.

The need therefore exists in the prior art for system authentication of calling party identification information generated from PBX systems. Such a provision would prevent fraudulent use of third party information as well as avoid common mistakes in entry of data in PBX systems.

Caller ID information authentication is of even greater complexity for interLATA calls in which several transmission carriers, including interexchange carriers, are involved. U.S. Pat. No. 5,530,741, issued to Rubin on Jun. 25, 1996, discloses a system wherein the interexchange carrier controls provision of calling party number. Authentication by the called party's local exchange carrier is thus dependent upon information under the control of other carrier(s).

DISCLOSURE OF THE INVENTION

The present invention overcomes the above noted prior art drawbacks of PBX calling party identification service in part by providing, on a per call basis, a system correlation of received caller identification information with pre-established parameters.

An advantage of the invention is that such correlation enables authentication of the received information so that authenticated information will be transmitted to the called party with the routed call and unauthenticated information can be blocked as the call is routed.

An additional advantage of the present invention is that, instead of blocking transmission, unauthenticated information can be transmitted with an indication that such information has not been authenticated. With such feature, the called party may be able to detect a mistake in the information such as, for example, a transposition of numbers. The called party may be able to discern the correct calling party number by recognizing the accurate number, having been informed of the nonauthentication, or by associating transmitted textual information with the accurate number.

The present invention uses capabilities of the advanced intelligent network (AIN) to control the authentication process. The central office switching facility associated with the calling PBX system identifies calls therefrom that contain caller ID numbers that are not the PBX assigned telephone number. For such calls, the switching facility invokes triggers through the AIN common channel signaling network to access data base information in an Integrated Service Control Point (ISCP) and/or system LIDB for authenticating and controllably transmitting caller ID information. The term "caller ID" is used herein to refer generally to provision to a called party during the ringing signal phase of call processing, of information associated with the calling party. Unauthenticated information may be blocked or transmitted with notice that the information has not been authenticated. For an interLATA call, the switching facility associated with the called party, upon receiving indication via the common channel signaling network that the call originated at a PBX station and determining that the called party is a caller ID subscriber, can invoke an AIN trigger for authentication and control in the same manner.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
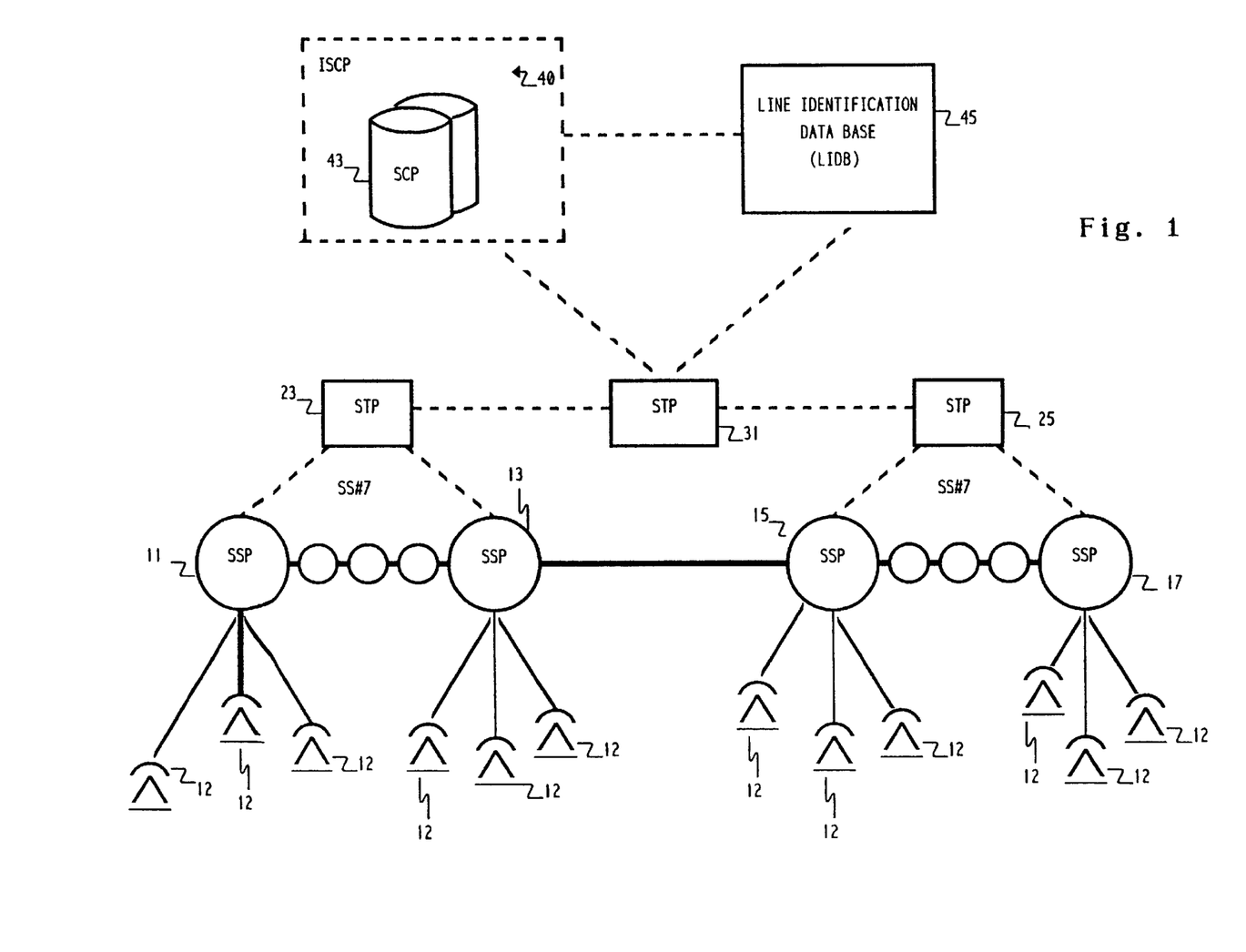
FIG. 1 is a simplified block diagram of a telecommunications network having a common channel signaling Advanced Intelligent Network (AIN) linked with a Line Identification Data Base (LIDB).

FIG. 1 is an AIN architectural environment having functional blocks representing those details of the AIN network that are well known. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected.

SSP capable central office switching systems typically contain a programmable digital switch with CCIS communications capabilities. One example of an SSP capable CO switch is a 5ESS type switch manufactured by AT&T. Other vendors, such as Northern Telecom and Seimens, manufacture comparable digital switches that may serve as the SSPs. The structure of an exemplary SSP type CO is discussed in more detail below, with regard to FIG. 2.

The SSP type COs 11 and 13 are shown connected to a first local area STP 23, SSP-COs 15 and 17 being connected to a second local area STP 25. The connections to the STPs are for signalling purposes. Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSPs or not, may function primarily as tandem type offices providing connections between trunk circuits only. Line identification data base (LIDB) 45 is a telephone data base system that stores subscriber information files for working telephone numbers. The LIDB data base is shown linked by data lines to ISCP 40 and STP 31. Although not shown, the LIDB data base may be directly accessed also by other STPs.

The advanced intelligent network contains a central data base 43, at ISCP 40, to which reference is made for controlling switching operations through multiple end offices. The central data base includes a plurality of Call Processing Records (CPRs), each associated with a subscriber. Local and/or toll offices of the public telephone network detect one of a number of call processing events, or triggers, both on incoming and outgoing calls to provide a wide variety of customized telephone services. When an AIN capable office Service Switching Point (SSP) detects a trigger, that office suspends call processing, compiles a call data message, and forwards that message via a common channel interoffice signalling (CCIS) link, typically SS7, to the central data base. Reference is made therein to the appropriate CPR to obtain information necessary for completion of the call. Thus the SSPs recognize AIN type calls, launch queries to the ISCP and receive commands and data from the ISCP to further process the AIN calls. In the illustrated embodiment, the CO-SSPs are end offices.

The links between the central office switching systems and the local area STPs 23 and 25 are typically SS7 type CCIS interoffice data communication channels. The local area STPs are in turn connected to each other and to the regional STP 31 via a packet switched network. The regional STP 31 also communicates with the ISCP 40 via a packet switched network. As illustrated in the drawing, common channel signaling uses an out of band signaling path, indicated by dotted lines, that is separate from the path used for voice transmission, indicated by solid lines. This signalling technology provides for faster call set-up times and a more efficient use of the voice network than prior manual signaling, dial pulse signaling or multi-frequency signaling schemes wherein the trunk connecting the calling and the called subscribers required both signaling and voice transmission over the same circuitry. When a call is placed, the voice communication is suspended while signaling is transmitted through the common channel signaling network to check whether the line at the destination switch is busy and to determine the voice connection path.

The messages transmitted between the SSPs and the ISCP are formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node. Reference is made to the copending application, Ser. No. 08/248,980, filed May 25, 1994, for a more detailed description of the AIN network.

Figure 2:
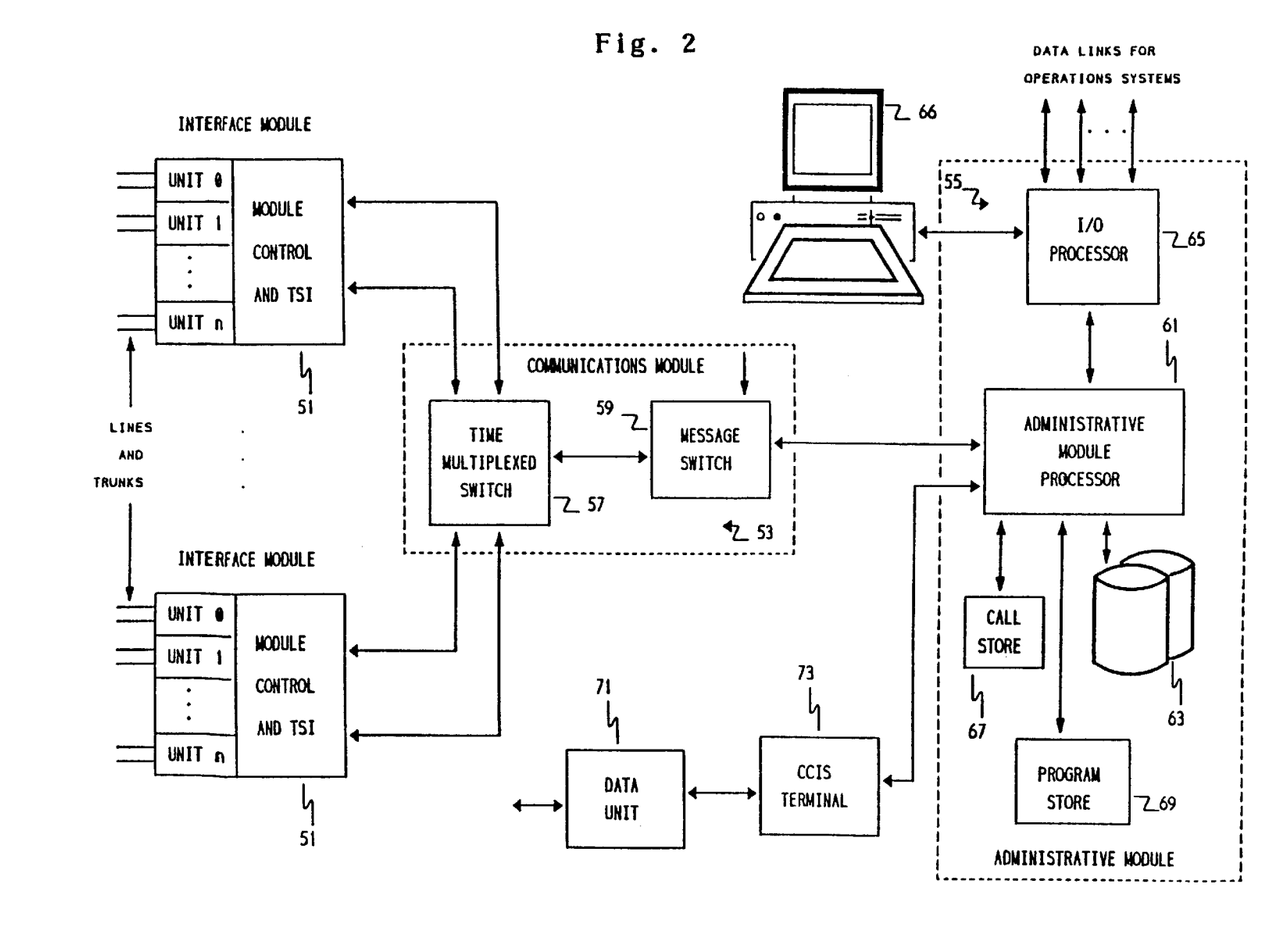
FIG. 2 is a more detailed diagram of one of the SSP type central offices used in the preferred AIN implementation of the present invention.

FIG. 2 is a simplified block diagram of an electronic program controlled switch which may be used as any one of the SSP type COs in the system of FIG. 1. As illustrated, the CO switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc., that are physically wired to a main distribution frame (not shown) in the central office. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example, a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS7 network connection to an STP or the like, as shown in FIG. 1, for facilitating call processing signal communications with other COs and with the ISCP 40.

The administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. Translation tables, including subscribed class features are loaded into the store with each call. The program store 69 stores program instructions which direct operations of the computer serving as the administrative module processor.

Figure 3:
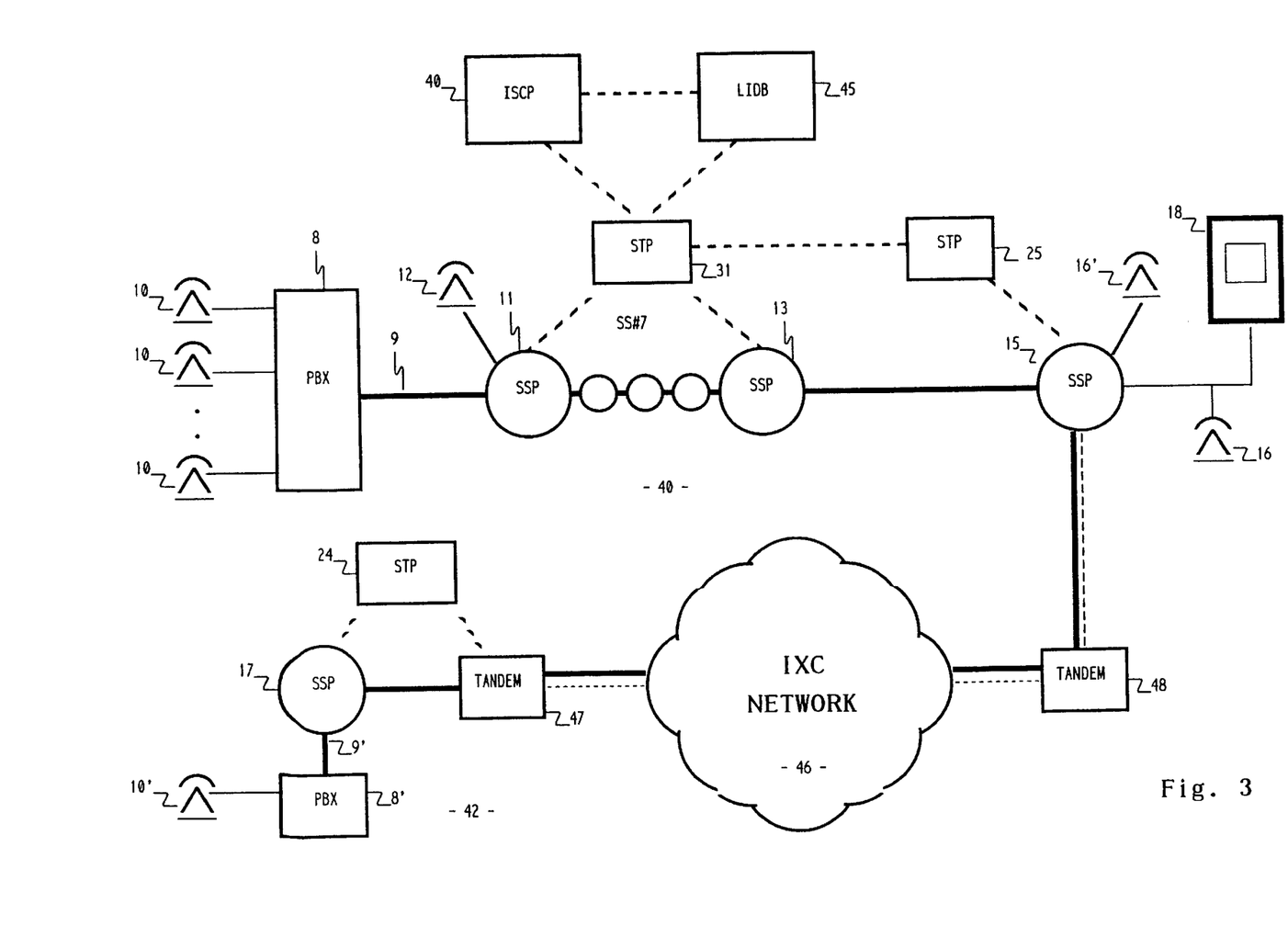
FIG. 3 is a simplified block diagram of a multi-LATA PSTN network to which PBX systems are coupled for processing of calls in accordance with the present invention.

FIG. 3 is a block diagram of a multi-LATA PSTN network to which PBX systems are coupled for processing of calls in accordance with the present invention. It should be recognized that the figure is considerably simplified for explanation purposes and that the full network and operating environment for the invention may comprise multiple central offices, diverse interconnections, and provisions for reliability through redundancy, all of which need not be shown for developing an understanding of the invention. Elements of this figure that are in common with those of FIG. 1 are referenced by the same numbers. Telephone station 16 is equipped with caller ID display unit 18, which may embody any commercially available alphanumeric display unit, and connected by a subscriber line to central office SSP 15. For purposes of explanation of the invention, station 16 is assumed to be a subscriber of caller ID, a status which is programmed into the subscriber profile at SSP 15. Calls routed to station 16 may originate within its LATA 40 or from a remote LATA 42.

As illustrated, LATA 40 includes SSPs 11, 13 and 15 that are linked by voice trunks. Also included is tandem switching facility 48 that is the point of presence for interexchange carrier network 46. The LATA is served by the common channel signaling SS#7 AIN network that includes, for purposes of illustration, STPs 25 and 31, ISCP 40, and LIDB 45. SSP 11 is shown connected by a subscriber line to telephone station 12 and by PBX trunk 9 to PBX 8. PBX 8 is an on premises system that serves a plurality of telephone stations 10 over a private voice network.

Remote LATA includes SSP 17 coupled by voice trunk to tandem 47, which is the point of presence for interexchange network 46. STP 24 is part of a common channel signaling network that may be coupled in any of various ways, for example by direct connection or through an intermediary network, to the AIN network of LATA 40. FSSP 17, while in actuality servicing a large number of subscribers, is shown connected by PBX trunk 9' to PBX 8'. PBX 8' is a private voice network system that serves a plurality of telephone stations, one of which is shown at 10'.

Figure 4A:
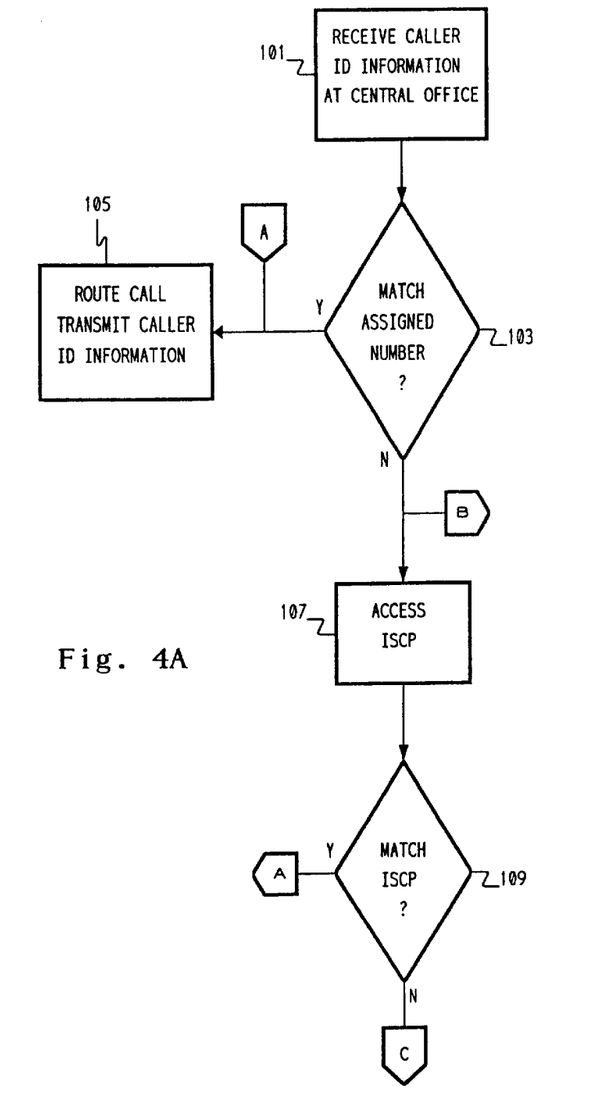
FIGS. 4A and 4B together comprise a simplified flow diagram for one preferred operational embodiment in accordance with the present invention.
Figure 4B:
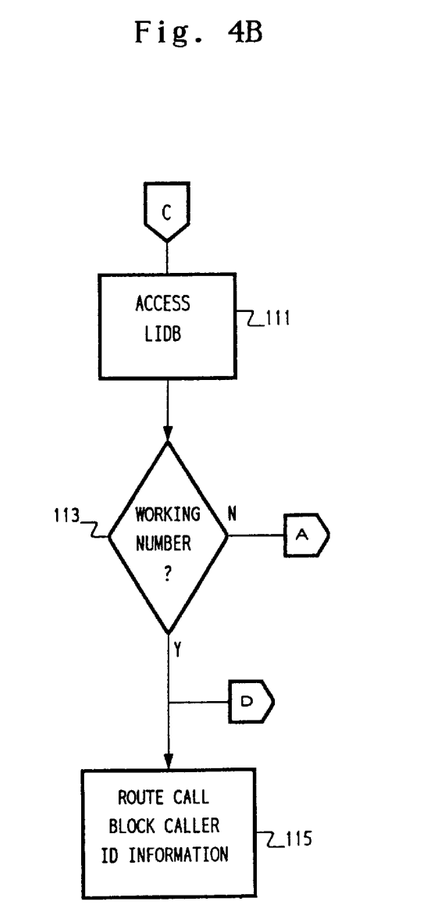

Operation of the invention is described with reference to the flow charts of FIGS. 4A–4D. FIGS. 4A and 4B together comprise one preferred operational embodiment. A call is initiated to called party subscriber station 16 by telephone station 10 or telephone station 10' at respective PBX systems 8 or 8'. The call may thus originate from a location within the same LATA 40 as that of the called party or from a station at a remote LATA 42. The call will be output by the PBX system over trunk 9 or 9' to the associated switching facility 11 or 17. The PBX system may be programmed to output, in addition to the dialed signals of the calling party, caller ID information data over a data channel via the PBX trunk. The textual content and originating number of the caller ID information can be made specific to the particular calling station at the discretion of the user or as determined by PBX system personnel. Caller ID information may be limited to text if the user chooses not to disclose the originating number. In that instance, no caller ID telephone number is transmitted. Conversely, the user may prefer to merely identify the internal number of the dialing station or the main PBX dial-in number. Each outgoing call thus can include specialized caller ID information or, in the absence thereof, the number associated with the PBX terminal along with the dialed signals.

At step 101, caller ID information and dialed signals are received from the PBX 8, 8' by the associated switching facility 11, 17. The switch compares the caller ID telephone number, if any, received with the number assigned to the PBX terminal by the PSTN, at step 103. If the numbers are the same, or if no caller ID number is received, routing of the call takes place in the normal fashion with the received caller ID information transmitted to the called party station, at step 105. If the switch detects a caller ID number that does not match the assigned PBX terminal number in step 103, call processing is temporarily suspended and triggering of the AIN network occurs at step 107, wherein a TCAP message is sent from the switch to the ISCP via the common channel signaling network. The ISCP data base is accessed for the call processing record of the PBX subscriber.

The PBX call processing record includes a list of internal telephone numbers for the PBX stations, as well as alternate numbers that have been approved for use as caller ID displayed numbers. Such approval can be based upon various criteria such as, for example, agreement by the subscriber of the alternate number. At step 109, a comparison is made between the received caller ID number, if any, and the numbers listed in the PBX CPR at the ISCP. If a match results, the call is routed to the dialed destination with the caller ID information transmitted therewith.

A failure of a match determination in step 109 is indicative that either an unauthenticated number or no number has been included in the caller ID information. Various possibilities include (i) that only textual identification was intended to be received, (2) that an error was made in programming an incorrect number in the PBX system, and (3) fraudulent or intentional insertion of a non-approved working number has been generated by the PBX system. If no match is determined in step 109, the LIDB data base is accessed at step 111. At step 113, determination is made of whether the received caller ID information contains a number that matches a working telephone number in the LIDB data base. Upon failure of such a match, processing of the call will continue with transmission of the received caller ID information to the called party. As the called party will have displayed either text alone or a non-working number, a call to the displayed number by the called party can not be completed unintentionally to a third party. The called party may recognize from the displayed information that a mistake exists and be able to discern an accurate number for identification purposes or for a return call.

A matching condition in step 113 indicates that the received caller ID information includes a working number that has not been authorized. Transmission of such information alone would not be desirable as the information, whether fraudulent or simply inaccurate, could lead the called party to initiate a call that would be a nuisance to both parties. Thus, at step 115, the call is routed to its dialed destination with transmission of the caller ID information blocked. The called party can thus decide whether to answer an unidentified call and not be faced with returning a call that may become a nuisance.

Figure 4C:
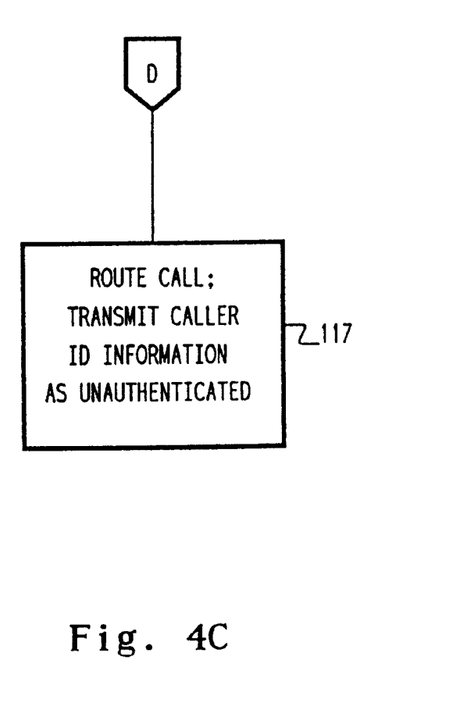
FIG. 4C is a partial flow diagram that illustrates a variation of the embodiment of FIGS. 4A and 4B.

FIG. 4C is a partial flow diagram that illustrates a variation of the embodiment of FIGS. 4A and 4B. Operation differs only with respect that, in response to a matching working number determination in step 113, transmission of the caller ID information, together with a message that the information has not been authorized, occurs at step 117. The called party is thus made aware that the received number is not accurate and has the opportunity to recognize a mistake, such as transposed digits. Received textual information may further clarify a mistake in the generation of the caller ID information.

Figure 4D:
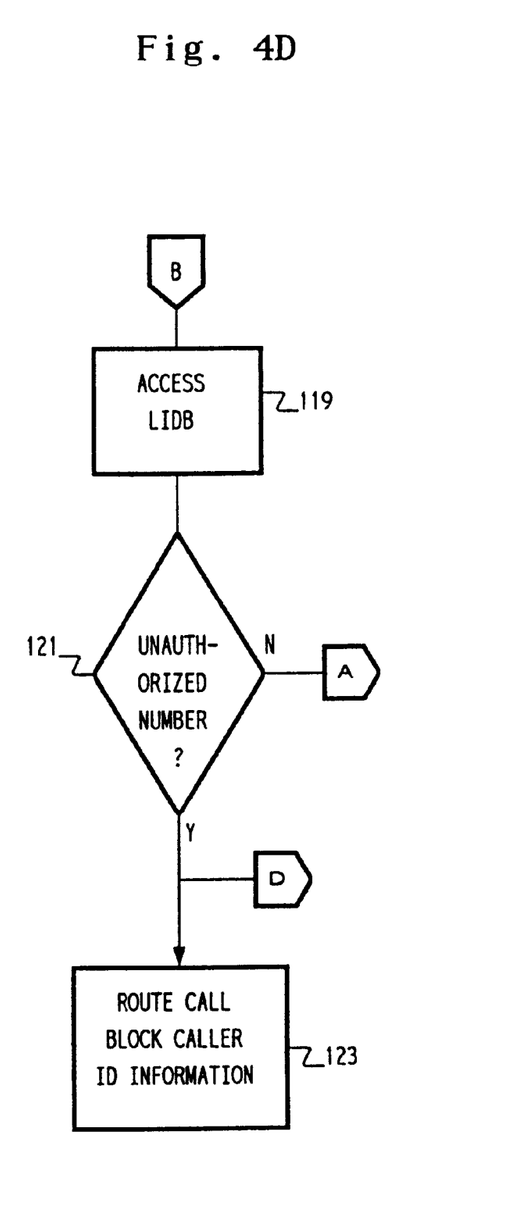
FIG. 4D is a partial flow diagram of an additional embodiment of the present invention, similar in several respects to those of FIGS. 4A–4C.

FIG. 4D is a partial flow diagram of an additional embodiment, similar in several respects to those of FIGS. 4A–4C. Rather than provide PBX call processing records in the ISCP, authorized caller ID numbers are associated with the PBX in the LIDB data base. Operation proceeds in the same manner as steps 101 through 105 of the flow diagram of FIG. 4A. However, in this embodiment, if the switch detects a caller ID number that does not match the assigned PBX terminal number in step 103, call processing is temporarily suspended and triggering of the AIN network occurs at step 119, to access the LIDB data base via the common channel signaling network. If a received caller ID number is not an authorized number in the LIDB data base, as determined by matching the received number against the listed numbers in step 121, the call is routed to its dialed destination with transmission of the caller ID information blocked, at step 123. Alternatively, transmission of the caller ID information, together with a message that the information has not been authenticated, can be made to the called party, as provided at step 117 in FIG. 4C.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, for inter LATA calls originating from carriers that do not normally provide PBX authentication, triggering of the ISCP data base or LIDB data base can be initiated by the central office switching facility that is associated with the called party. The switching facility determines from its record profile for the called party subscriber that caller ID service has been subscribed for an incoming call. During processing of the call, the called party switching facility can determine from signalling received from the calling switching facility whether caller ID information generated by the originating PBX contains a telephone number that matches the assigned main PBX number. If a set bit in the received signalling is indicative that no such match exists, the called party switching facility can initiate authentication in the manner described above with respect to the embodiments of FIGS. 4A–4D.

What is claimed is:

1. A method for supplying calling party information for a telephone call originating from a PBX system, coupled to a public switched telephone network (PSTN) and having a telephone number assigned to its terminal address, to a called party station at a remote location, comprising the steps of:

receiving from said PBX, at a location in said PSTN, dialed called party telephone number input and calling party identifying information generated by said PBX;

determining whether said calling party identifying information contains a telephone number that matches the PBX assigned telephone number;

in response to a non-matching condition in said determining step, accessing a data base;

comparing said calling party identifying information with said data base;

routing the call to said called party station; and in response to a match between a number contained in said calling party identifying information and a number found in said data base in said comparing step, transmitting said calling party identifying information to said called party station.

2. A method as recited in claim 1, wherein said PSTN comprises an advanced intelligent network having at least one integrated services control point (ISCP), and wherein said accessing step comprises:

triggering a PSTN switching facility at said location that is associated with said PBX system; and sending a query message from said switching facility to said data base, said data base being remote from said switching facility.

3. A method as recited in claim 2, further comprising the step of transmitting said calling party identifying information, without accessing said data base, in response to a matching condition in said determining step.

4. A method as recited in claim 2, further comprising the step of blocking transmission of said calling party identifying information to said called party station, in response to a failure to match a number contained in said received information with a number in said data base in said comparing step.

5. A method as recited in claim 4, wherein said blocking step comprises sending a response message from said ISCP to said switching facility.

6. A method as recited in claim 2, further comprising the steps of:

transmitting said calling party identifying information to said called party station; and in response to a failure to match a number contained in said calling party identifying information to a number found in said data base in said comparing step, transmitting to said called party station a message indicating that said information is not authenticated;

whereby the calling party identifying information generated by said PBX and the unauthenticated status thereof can be displayed at the called station.

7. A method as recited in claim 2, wherein said ISCP includes said data base and, in response to a failure to match a number contained in said received information with a number in said data base in said comparing step, further comprising the steps of:

accessing a line identification data base (LIDB) in said PSTN that is remote from said ISCP;

determining from the LIDB whether the number contained in said received information is a working telephone number; and transmitting said calling party identifying information to said called party station in response to a non-working number determination in said determining step.

8. A method as recited in claim 7, further comprising the step of blocking transmission of said calling party identifying information to said called party station, in response to a working number determination in said determining step.

9. A method as recited in claim 7, further comprising the steps of:

transmitting said calling party identifying information to said called party station; and in response to a working number determination in said determining step, transmitting to said called party station a message indicating that said information is not authenticated;

whereby the calling party identifying information generated by said PBX and the unauthenticated status thereof can be displayed at the called station.

10. A method as recited in claim 2, wherein said data base is a line identification data base (LIDB) in said PSTN that is remote from said ISCP, and wherein said accessing step further comprises initiating a lookup in said LIDB by said ISCP.

11. A method as recited in claim 1, wherein said PSTN comprises an advanced intelligent network having at least one integrated services control point (ISCP) interconnecting a plurality of PSTN switching facilities via a common channel signaling link, and wherein said accessing step comprises:

triggering a PSTN switching facility that is associated with said called party station; and sending a query message from said switching facility to said data base via said common channel signaling link.

12. A method as recited in claim 11, wherein said PBX system is coupled to switching facility in a local access transport area (LATA) that is different from the called party associated switching facility LATA.

13. In a public switched telephone network having a plurality of telephone switching facilities, subscriber telephone lines for connecting said facilities to respective associated subscriber stations, and at least one PBX trunk for connecting one of said switching facilities to an associated subscriber PBX system that serves a plurality of stations connected thereto, the improvement comprising:

receiving means for receiving called party telephone number input and calling party identifying information generated by said PBX system for a call placed from a calling station connected to said PBX system;

determining means for determining whether said received calling party identifying information is a previously authorized representation for identifying the calling station; and routing means for routing said call to its dialed called party destination with said calling party identifying information in response to a determination by said determining means that said calling party identifying information is an authorized representation of the calling station.

14. A network as recited in claim 13, wherein said routing means comprises blocking means for blocking transmission of said calling party identifying information in the routed call to the called party in response to a determination by said determining means that said calling party identifying information is not an authorized representation of the calling station.

15. A network as recited in claim 13, wherein said routing means comprises messaging means for generating message information indicating that said calling party identifying information is not an authorized representation of the calling station in response to a determination of nonauthorization by said determining means, said routing means including said calling party identifying information and said message information in the routed call;

whereby the calling party identifying information generated by said PBX and the nonauthorized status thereof can be displayed at the called party subscriber station.

* * * * *